R. TREAT.
SYSTEM OF POWER TRANSMISSION.
APPLICATION FILED MAR. 4, 1918.
1,328,465.
Patented Jan. 20, 1920.
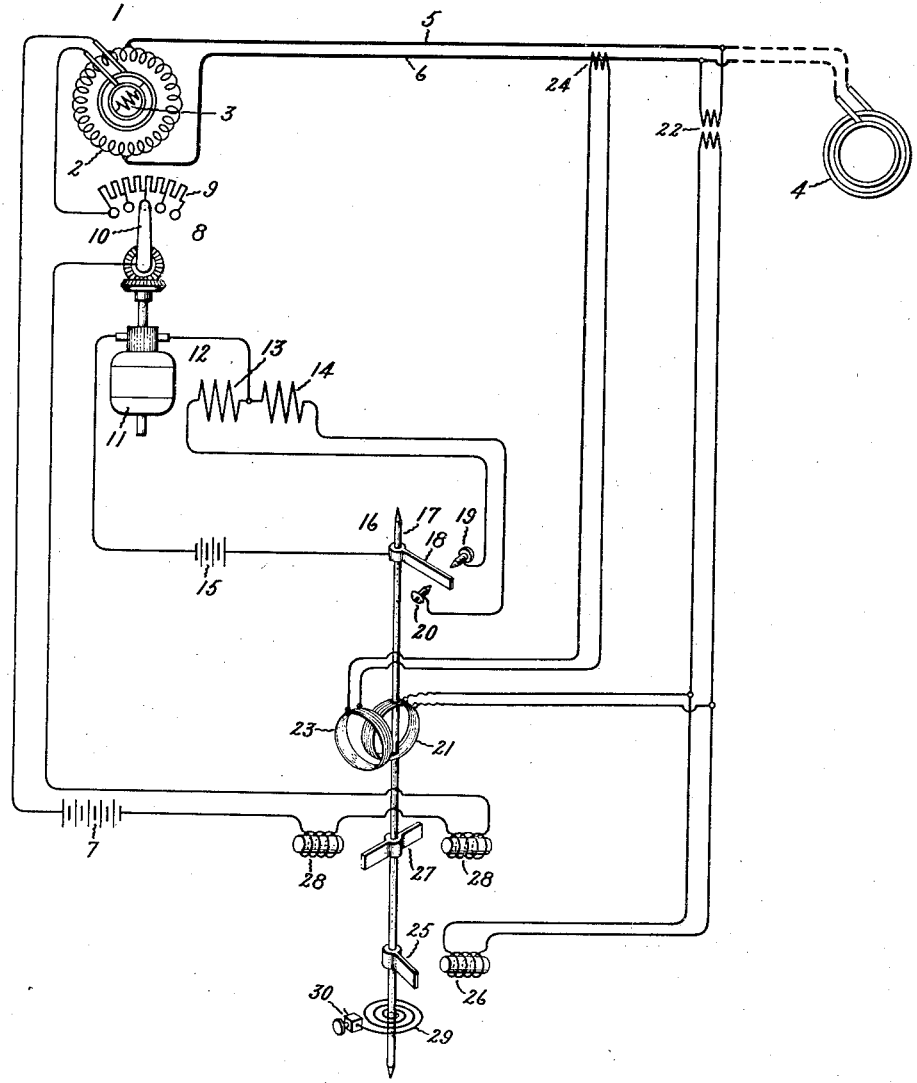
Inventor:
Robert Treat,
by
His Attorney.

UNITED STATES PATENT OFFICE.

ROBERT TREAT, OF SCHENECTADY, NEW YORK, ASSIGNOR TO GENERAL ELECTRIC COMPANY, A CORPORATION OF NEW YORK.

SYSTEM OF POWER TRANSMISSION.

1,328,465.  Specification of Letters Patent.  Patented Jan. 20, 1920.

Application filed March 4, 1918. Serial No. 220,268.

*To all whom it may concern:*

Be it known that I, ROBERT TREAT, a citizen of the United States, residing at Schenectady, in the county of Schenectady, State of New York, have invented certain new and useful Improvements in Systems of Power Transmission, of which the following is a specification.

My invention relates to systems of power transmission and particularly to alternating current systems of power transmission comprising a synchronous dynamo-electric machine and a source of alternating current for driving the same.

The object of my invention is to provide means, in a system of the kind referred to, for maintaining a predetermined phase relation between the current and voltage supplied to the synchronous dynamo-electric machine notwithstanding variations, within the range over which the system is intended to operate, in the power and voltage supplied to said machine.

Assuming the voltage supplied to a synchronous dynamo-electric machine by a source of alternating current to remain constant, it is necessary, in order to maintain a predetermined phase relation between the current and voltage supplied thereto, that the excitation of the machine be varied with variations in the load thereon, and consequently with the power consumed thereby. Furthermore, assuming the load on, and hence the power consumed by, a synchronous dynamo-electric machine to remain constant, it is necessary, in order to maintain a predetermined phase relation between the current and voltage supplied thereto, that the excitation of the machine be varied with variations in the voltage applied thereto. In accordance with my invention, therefore, I provide, in combination with a synchronous dynamo-electric machine and a source of alternating current for driving the same, means for exciting said machine, and means responsive both to the alternating current power and the alternating current voltage supplied to said machine for varying the excitation thereof.

My invention may best be explained by reference to the accompanying drawing, the single figure of which shows one modification of my invention as embodied in a single phase system.

Referring to the drawing, 1 represents a synchronous motor having an armature 2 and an exciting winding 3, 4 represents an alternating current generator connected by means of the mains 5 and 6 to supply current to the synchronous motor. 7 represents a source of direct current from which the current for the excitation of the exciting winding 3 is supplied. 8 represents a motor-operated rheostat for controlling the resistance in series with, and hence the excitation of, the exciting winding 3. The motor-operated rheostat 8 comprises a resistance 9 and a contact arm 10 which is mechanically connected to be driven by the armature 11 of a motor 12. The motor 12 is provided with a plurality of field windings 13 and 14 so arranged that, when current traverses the armature 11 and the field winding 13, the contact arm 10 is moved in a direction to cut out portions of the resistance 9 and, when current traverses the armature 11 and the field winding 14, the contact arm 10 is moved in a direction to cut in portions of the resistance 9. 15 represents a source of current for operating the motor 12. 16 represents a contact making device comprising a movably mounted spindle 17. At the upper end of the spindle 17 is mounted a contact arm 18 electrically connected to one terminal of the source of current 15 and adapted to engage the stationary contact 19, which is connected to one terminal of the motor field winding 13, and to engage the stationary contact 20, which is connected to one terminal of the motor field winding 14. A winding 21 is also fixed upon the spindle 17 and is connected, by means of a potential transformer 22, to the mains 5 and 6 adjacent to the synchronous motor 1. A stationary winding 23 is connected in series with the secondary of a current transformer 24, whose primary is inserted in the main 6, and coöperates with the winding 21 to develop a torque, which is proportional to the power consumed by the synchronous motor 1, tending to rotate the spindle 17 in a counter clockwise direction, when viewed from above. An armature 25 is fixed to the spindle 17 near the lower end thereof and is attracted by an electromagnet 26, the energizing winding of which is connected to the mains 5 and 6 by means of the potential transformer 22. The armature 25 and the electromagnet 26 develop a torque, which is proportional to the voltage across the mains 5 and 6, tending to rotate the spindle 17 in a counter clockwise direction. An armature 27 is fixed to the spindle 17 and is attracted by one or more electromagnets 28, the energizing windings of which are connected in series with the exciting winding 3 of the synchronous motor 1, the source of current 7, and the resistance 9. The armature 27 and the electromagnets 28 develop a torque, which is proportional to the current traversing the exciting winding 3, tending to rotate the spindle 17 in a clockwise direction. A spring 29, the tension of which may be adjusted by means of the device 30, is also connected to the spindle 17, and tends to rotate the spindle 17 in a clockwise direction.

The operation of my invention, as at present understood, is as follows:

It having been determined what variation in the current traversing the exciting winding 3 is necessary in order to maintain the desired predetermined phase relation between the current and voltage supplied to synchronous motor 1 for a given variation in the power and in the voltage supplied thereto, the contact making device 16 will have been designed and constructed so that, for any value of the power and voltage supplied to the synchronous motor 1, within the range over which the system is intended to operate, the torque exerted by the co-operating windings 21 and 23 and the torque exerted by the armature 25 and the electromagnet 26 will be balanced by the torque exerted by the armature 27 and the electromagnets 28 and by the torque of the spring 29 only when the current traversing the winding 3 has been adjusted to give the desired predetermined phase relation between the current and voltage supplied to said machine.

Assume the system to be operating, a certain amount of power and voltage to be supplied to the synchronous motor 1, and the current traversing the exciting winding 3 to have such a value that the contact making device 16 is in the position illustrated. Under these conditions the current and voltage supplied to the synchronous motor 1 will have the desired predetermined phase relation. If, now, the voltage or the power supplied to the synchronous motor 1 vary, the torque exerted upon the spindle 17 of the contact making device 16 by the windings 21 and 23 or by the armature 25 and the electromagnet 26 will vary, thereby causing the contact arm 18 to engage with either the stationary contact 19 or the stationary contact 20. If the resultant of the torque exerted by the windings 21 and 23 and of the torque exerted by the armature 25 and the electromagnet 26 be increased, the contact arm 18 will engage with the stationary contact 19, whereas if the resultant torque be decreased the contact arm 18 will engage with the stationary contact 20. Upon engagement of the contact arm 18 with the stationary contact 19, the motor 12 will be rotated by power supplied from the source of current 15 so as to cut out portions of the resistance 9 and hence increase the current traversing the exciting winding 3. The operation of the motor 12 will continue until the torque exerted by the armature 27 and the electromagnets 28 balance the resultant torque, referred to, whereupon the contact arm 18 is disengaged from the stationary contact 19. When this condition occurs the phase relation of the current and voltage supplied to the synchronous motor 1 will have been restored to the desired predetermined phase relation, notwithstanding the variation which has occurred in the value of the power and voltage supplied thereto. Similarly upon engagement of the contact arm 18 with the stationary contact 20, the motor 12 will be operated by power supplied from the source of current 15 to cut in portions of the resistance 19 and hence the current traversing the exciting winding 3. The operation of the motor 12 will continue until the torque exerted by the armature 27 and electromagnets 28 balances the resultant torque, referred to, whereupon the contact arm 18 is disengaged from the stationary contact 20. When this condition occurs, the desired predetermined phase relation between the current and voltage supplied to the synchronous motor 1 will have been restored, notwithstanding the variation in the power and voltage supplied to the synchronous motor 1.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:

1. The combination with a synchronous dynamo-electric machine, of a source of alternating current for driving the same, means for exciting said machine, and means responsive both to the alternating current power and the alternating current voltage supplied to said machine for varying the excitation thereof.

2. The combination with a synchronous dynamo-electric machine, of a source of alternating current for driving the same, means for exciting said machine, and means, comprising a contact making device responsive both to the alternating current power and the alternating current voltage supplied to said machine, for varying the excitation thereof.

3. The combination with a synchronous dynamo-electric machine, of a source of alternating current for driving the same, means for exciting said machine, and means responsive to the exciting current of said machine and both to the alternating current power and the alternating current voltage supplied to said machine for varying the excitation thereof.

4. The combination with a synchronous dynamo-electric machine, of a source of alternating current for driving the same, means for exciting said machine, and means, comprising a contact making device responsive to the exciting current of said machine and both to the alternating current power and the alternating current voltage supplied to said machine for varying the excitation thereof.

5. The combination with a synchronous dynamo-electric machine, of a source of alternating current for driving the same, means for exciting said machine, and means, comprising a contact making device, for varying the excitation of said machine, said contact making device comprising a movable element, means, responsive to the power consumed by said machine and to the voltage applied to said machine, tending to move said element in one direction to increase the excitation, and means, responsive to the exciting current of said machine, tending to move said element in the opposite direction to decrease the excitation.

6. The combination with a synchronous dynamo-electric machine, of a source of alternating current for driving the same, a source of current for exciting said machine, a motor-operated rheostat for varying the excitation of said machine, and a contact making device for controlling the operation of said motor-operated rheostat, said contact making device comprising a movable element, means, responsive to the power consumed by said machine and to the voltage applied to said machine, tending to move said element in one direction and thereby to cause the motor-operated rheostat to increase the excitation of said machine, and means, responsive to the exciting current of said machine, tending to move said element in the opposite direction and thereby to cause the motor-operated rheostat to decrease the excitation of said machine.

7. The combination with a synchronous dynamo-electric machine, of a source of alternating current for driving the same, a source of current for exciting said machine, a motor-operated rheostat for varying the excitation of said machine, and a contact making device for controlling the operation of said motor-operated rheostat, said contact making device comprising a movable element, means, responsive to the power consumed by said machine and to the voltage applied to said machine, tending to move said element in one direction and thereby to cause the motor-operated rheostat to increase the excitation of said machine, and means, responsive to the exciting current of said machine, tending to move said element in the opposite direction and thereby to cause the motor-operated rheostat to decrease the excitation of said machine, and an adjustable spring for assisting the torque developed by one of said means.

In witness whereof I have hereunto set my hand this 26th day of February, 1918.

ROBERT TREAT.